United States Patent
Ehara et al.

(10) Patent No.: US 7,561,516 B2
(45) Date of Patent: Jul. 14, 2009

(54) PACKET RELAYING METHOD AND DEVICE

(75) Inventors: Junichi Ehara, Kawasaki (JP); Daisuke Namihira, Kawasaki (JP); Masao Yoshikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 797 days.

(21) Appl. No.: 10/995,789

(22) Filed: Nov. 22, 2004

(65) Prior Publication Data

US 2006/0018316 A1 Jan. 26, 2006

(30) Foreign Application Priority Data

Jul. 20, 2004 (JP) .............................. 2004-212152

(51) Int. Cl.
*G01R 31/08* (2006.01)

(52) U.S. Cl. ...................... 370/233; 370/252; 370/391; 370/395.42

(58) Field of Classification Search ............... 370/230.1, 370/233, 235, 230, 252, 395.42, 391
See application file for complete search history.

(56) References Cited

U.S. PATENT DOCUMENTS

| | | | | |
|---|---|---|---|---|
| 5,311,513 | A * | 5/1994 | Ahmadi et al. ............... | 370/230 |
| 6,748,435 | B1 * | 6/2004 | Wang et al. .................. | 709/225 |
| 6,970,426 | B1 * | 11/2005 | Haddock ................. | 370/235.1 |
| 7,027,395 | B2 * | 4/2006 | Elloumi et al. .............. | 370/231 |
| 7,277,388 | B1 * | 10/2007 | Koodli ..................... | 370/230.1 |
| 7,327,682 | B2 * | 2/2008 | Gandhi et al. ............ | 370/235.1 |
| 7,349,342 | B2 * | 3/2008 | Carpenter et al. ........ | 370/235.1 |
| 2004/0100901 | A1 * | 5/2004 | Bellows ...................... | 370/230 |
| 2004/0100977 | A1 | 5/2004 | Suzuki et al. | |
| 2005/0078602 | A1 * | 4/2005 | Mancour et al. ............ | 370/230 |
| 2005/0141427 | A1 * | 6/2005 | Bartky ........................ | 370/235 |

FOREIGN PATENT DOCUMENTS

| | | |
|---|---|---|
| JP | 7-107092 | 4/1995 |
| JP | 10-173664 | 6/1998 |
| JP | 2004-158903 | 6/2004 |

OTHER PUBLICATIONS

Notification of Reason(s) for Refusal dated Jan. 20, 2009, from the corresponding Japanese Application.
Toshimichi Suematsu, et al. "A Proposal and Evaluations of Marking Scheme in DiffServ" Technical Report of IEICE, vol. 103, No. 691, Feb. 26, 2004.

* cited by examiner

*Primary Examiner*—Ricky Ngo
*Assistant Examiner*—Dewanda Samuel
(74) *Attorney, Agent, or Firm*—Katten Muchin Rosenman LLP (57) ABSTRACT

In a network of a variable length packet system, a bps calculator colors an inputted packet based on a peak bandwidth or a committed bandwidth of a data bit number per unit time for every flow and a packet length of the inputted packet, a pps calculator colors the inputted packet based on a peak bandwidth or a committed bandwidth of a packet number per unit time for every flow and a packet number of the inputted packet, and one of a color of packet to be discarded, a color of packet to be passed and a color of packet to be discarded with a probability, within the colors obtained by colorings at both calculators is determined by a color selector.

6 Claims, 8 Drawing Sheets

$Tp(t)$: PEAK TOKEN COUNTER AT TIME $t$ $(0 \leq Tp(t) \leq Bp1)$
$Tc(t)$: COMMITTED TOKEN COUNTER AT TIME $t$ $(0 \leq Tc(t) \leq Bc1)$

FIG.3

Tp(t): PEAK TOKEN COUNTER AT TIME t $(0 \leq Tp(t) \leq Bp2)$
Tc(t): COMMITTED TOKEN COUNTER AT TIME t $(0 \leq Tc(t) \leq Bc2)$

| TIME | t1 | t2 | t3 | t4 | t5 | t6 | t7 | t8 | t9 |
|---|---|---|---|---|---|---|---|---|---|
| COLOR OUTPUT CL 1 | BLUE | YELLOW | RED | BLUE | YELLOW | RED | BLUE | YELLOW | RED |
| COLOR OUTPUT CL 2 | BLUE | BLUE | BLUE | YELLOW | YELLOW | YELLOW | RED | RED | RED |
| COLOR SELECTION BY COLOR SELECTOR 25 | BLUE | YELLOW | RED | YELLOW | YELLOW | RED | RED | RED | RED |

FIG.5

PRIOR ART

FIG.6

PRIOR ART

FIG. 7A
WHEN RATE IS CONFINED TO 1 Gbps
(SHORTEST PACKET 64 BYTES)
→OUTPUT 1,480,000 pps

→ 680,000 PACKETS ARE LOST

FIG. 7B
WHEN RATE IS CONFINED TO 1 Gbps
(LONGEST PACKET 1,514 BYTES)
→OUTPUT 80,000 pps

→ ONLY 1/10 IS APPLIED

PACKET RELAYING METHOD AND DEVICE

BACKGROUND OF THE INVENTION

1. Field of the Invention

The present invention relates to a packet relaying method and device, and in particular to a packet relaying method and device applied to a relaying device or the like within a communication network of a packet system.

2. Description of the Related Art

Owing to the Internet widespread and advanced, various kinds of data have been distributed in large quantity on the Internet or an intranet adopting an Internet protocol. Namely, a variety of data such as an e-mail data or WWW data requiring no real time property, an IP telephone requiring strict real time property, accounting system data requiring a high-speed and reliable data transfer, and the like share the same transmission line to be transmitted.

The Internet protocol (IP) that is a data communication rule used for the Internet is basically designed to treat the entire data equally. Therefore, on the network where a mixture of important and unimportant data is distributed, a problem occurs that a bandwidth for the important data is generally lost when the bandwidth is consumed by the transmission of the unimportant data.

In order to solve this problem, a method of enhancing the rate of a transmission path itself has been conventionally adopted. Although this method can improve the communication quality in the easiest way, the investment for new plant and equipment is high, and the plant and equipment become wasteful in a time zone while data do not flow, in case of burst data where an intermittent flow of large amount of data being concentrated in a short time like transmission/reception of e-mails. Thus, this method is not economically preferable.

Therefore, a technology for controlling a bandwidth by classifying data according to importance/unimportance and a real time property, and by assigning a large bandwidth to important data and data with a high real time property, and a small bandwidth to unimportant data with a low real time property has been developed. This is a network QoS (Quality of Service) technology.

The QoS generally indicates a service quality. However, the QoS of the network mainly indicates a quality concerning a transmission rate and a transmission delay. The QoS technology is installed in a packet relaying (switching) device on a network. A network designer designs a bandwidth control policy of the entire network, and guarantees or commits the QoS of the network by applying this policy to the relaying device existing on the network.

Figure 5:
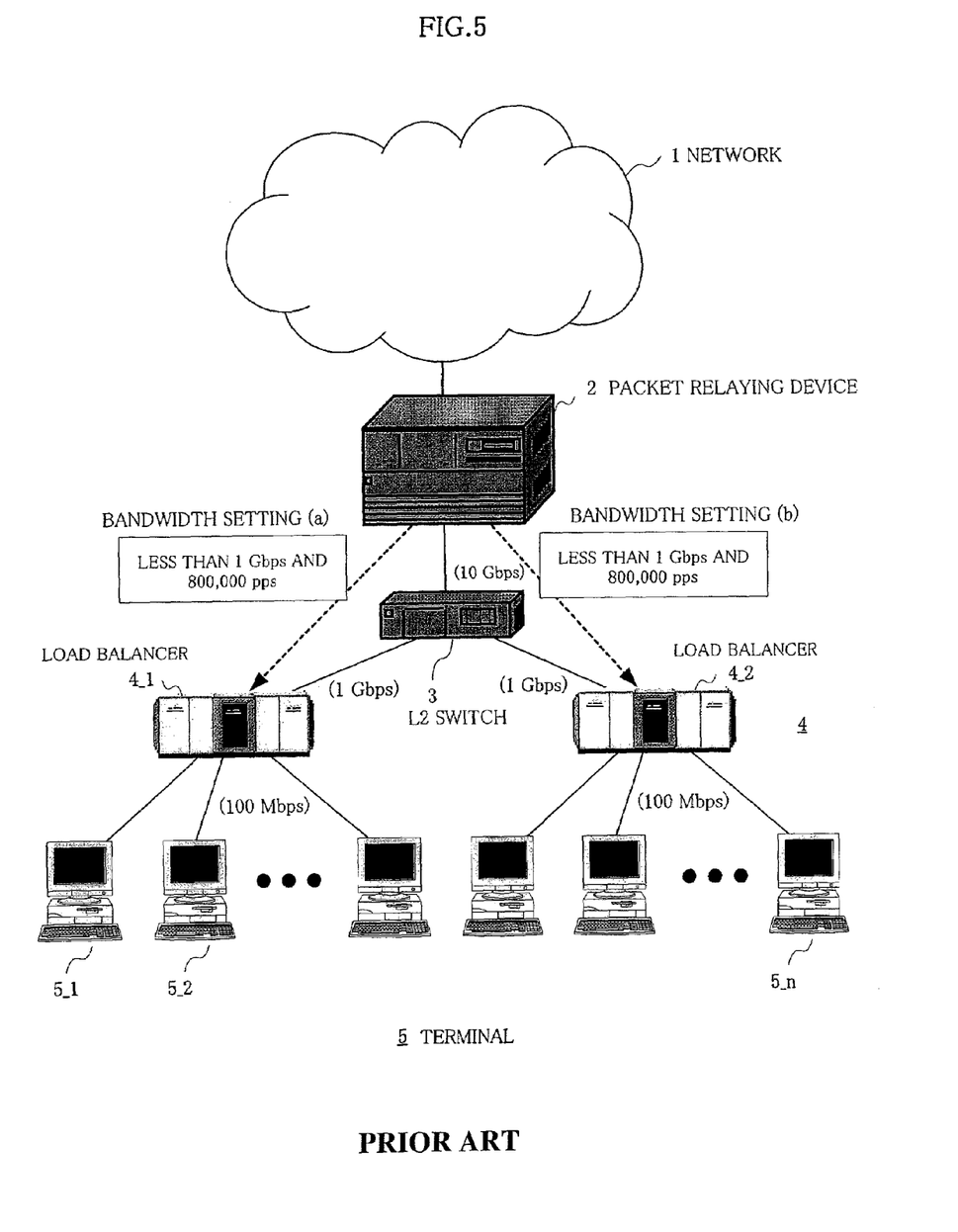
FIG. 5 is a diagram showing a network arrangement of a packet system applied to the present invention and the conventional technology.

FIG. 5 shows a general arrangement of a network including such a packet relaying device, where a packet relaying device 2 having received a packet from a network 1 transmits the packet to terminals (servers) 5_1-5_n (hereinafter, occasionally represented by a reference numeral "5") through an L2 switch 3 and load balancers 4_1 and 4_2 (hereinafter, occasionally represented by a reference numeral "4"). In this example, a packet of 10 Gbps from the packet relaying device 2 is confined or shaped to a packet of 1 Gbps by the L2 switch 3, which is further dispersed into packets of 100 Mbps by the load balancers 4 to be provided to the terminals 5. It is supposed that eight terminals 5 are connected to each of the load balancers 4.

Figure 6:
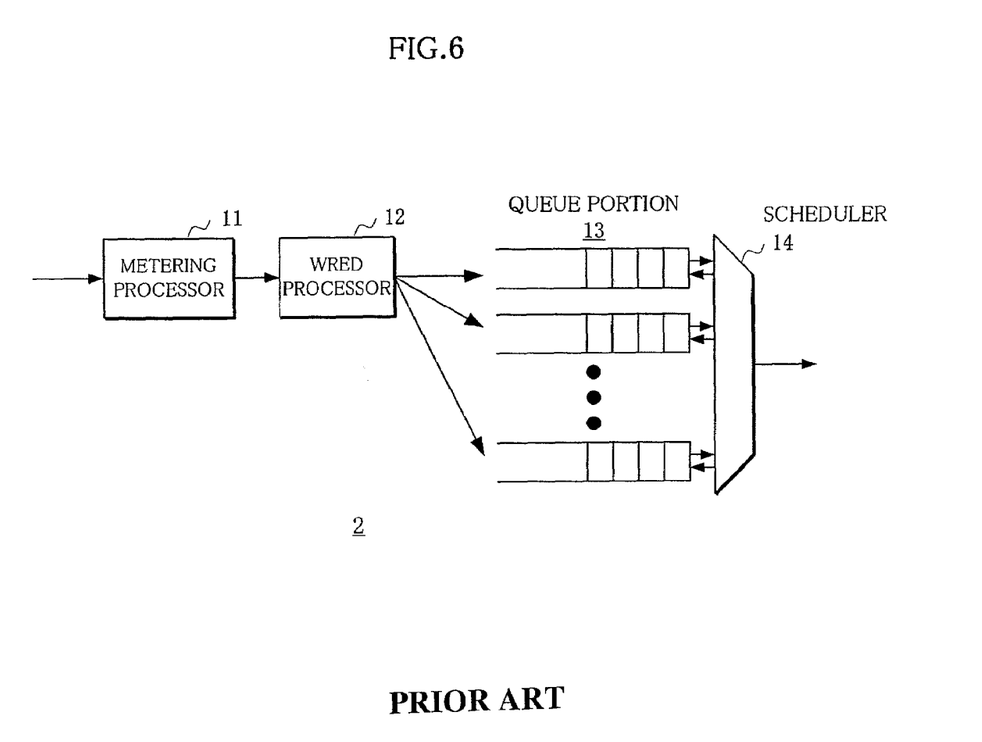
FIG. 6 is a block diagram showing a general arrangement of the packet relaying device shown in FIG. 5.

FIG. 6 shows a prior art arrangement of a bandwidth control (shaping) system in the packet relaying device shown in FIG. 5. This arrangement is composed of a metering processor 11, a WRED (Weighted Random Early Detection) processor 12, a queue portion 13, and a scheduler 14. It is supposed in this example that the flow per packet is specified (including information for identifying a packet flow).

Firstly, the metering processor 11 meters a quantity of a data flow (bit number=number of bit, per unit time) of inputted packets per flow. A peak (limit) token counter (data bit number=number of data bit) and a committed (guaranteed) token counter (packet number=number of packet) of the concerned flow are calculated from the time when the packets of the concerned flow came before, the present time, the length of an inputted packet, the peak bandwidth (Bp), and the committed bandwidth (Bc). By comparing the bit number calculated with the packet length of the inputted packets, information concerning the flow state is assigned to the inputted packets. This flow state information is represented by colors (typically three colors of red, yellow and blue) in conformance with a traffic signal (see e.g. non-patent documents 1 and 2). In this case, red means a packet which exceeds the peak bandwidth and is to be discarded, and blue means a packet to be passed. Adding the information to the packet is called "coloring".

The WRED processor 12 performs discarding with a probability based on a color attached by the metering processor 11 and the length of all the packets in the queue portion 13 to which the packets are to enter. Namely, the queue portion 13 is allocated a single queue per each flow. The WRED processor 12 performs discarding when the packet number in the queue is equal to or more than an upper limit value (designated value) and performs passing when the packet number is equal to or less than a lower limit value (designated value). When the packet number is between the upper limit value and the lower limit value, the WRED processor 12 performs discarding with a probability, whereby the packet is discarded in case of red, the packet is passed in case of blue and the packet is discarded based on a probability calculated according to the queue number in the queue portion in case of yellow.

The scheduler 14 schedules an output order and an output interval of the packets according to a metering subject of each queue and a priority designated per queue.

It is to be noted that as a technology for avoiding an overflow of a queue in bandwidth controlling (shaping) upon burst occurrence there are a shaping processing device and method (see e.g. patent document 1).

[Non-patent document 1] Heinanen, J. and R. Guerin, "A Single Rate Three Color Marker", RFC2697, 1999. (http://www.IETF.org.)

[Non-patent document 2] Heinanen, J. and R. Guerin, "A Two Rate Three Color Marker", RFC2698, 1999. (http://www.IETF.org.)

[Patent document 1]

Japanese Patent Application Laid-open No. 10-173664

In the conventional technology, metering of a quantity of data flow at the metering processor has been performed by a data bit number per unit time (generally expressed by a unit of bps (bit per second)) as mentioned above. This is because communication quality guarantee (QoS) firstly aims to avoid congestion of a data transmission line.

However, most of servers and load balancers do not have packet throughput enough to get the most out of line ability. This is due to complicated contents of various services performed by the servers. Also, even if the speed of the data line is enhanced, when the throughput of the packet relaying device does not catch up with such a speed enhancement, the packet relaying device itself becomes a bottleneck and the case where the QoS set can not be satisfied occurs. The packet throughput of the server, the load balancer and the packet relaying device is expressed by the packet processing number per unit time, and pps (packet per second) is generally used for its unit.

In case of a transmission system of a fixed length packet such as an ATM (Asynchronous Transfer Mode), the QoS including the throughput of the device can be regulated to some extent by controlling bps since bps is nearly proportional to pps. However, in case of a transmission system in which a packet length is variable such as the Ethernet (registered trademark), correlation between the bit number (bps) and the packet number (pps) is low. It is impossible to take account of the packet throughput of the device in the bandwidth control regulated solely by the bit number (bps) or the packet number (pps). Therefore, in the network of a variable length packet system including a server load balancer or the like whose packet throughput is low, a desired QoS has not been obtained in some cases.

This will now be described referring to packet relaying systems [1] and [2] respectively shown in FIGS. 7A, 7B, 8A and 8B.

Figures 7A, 7B:
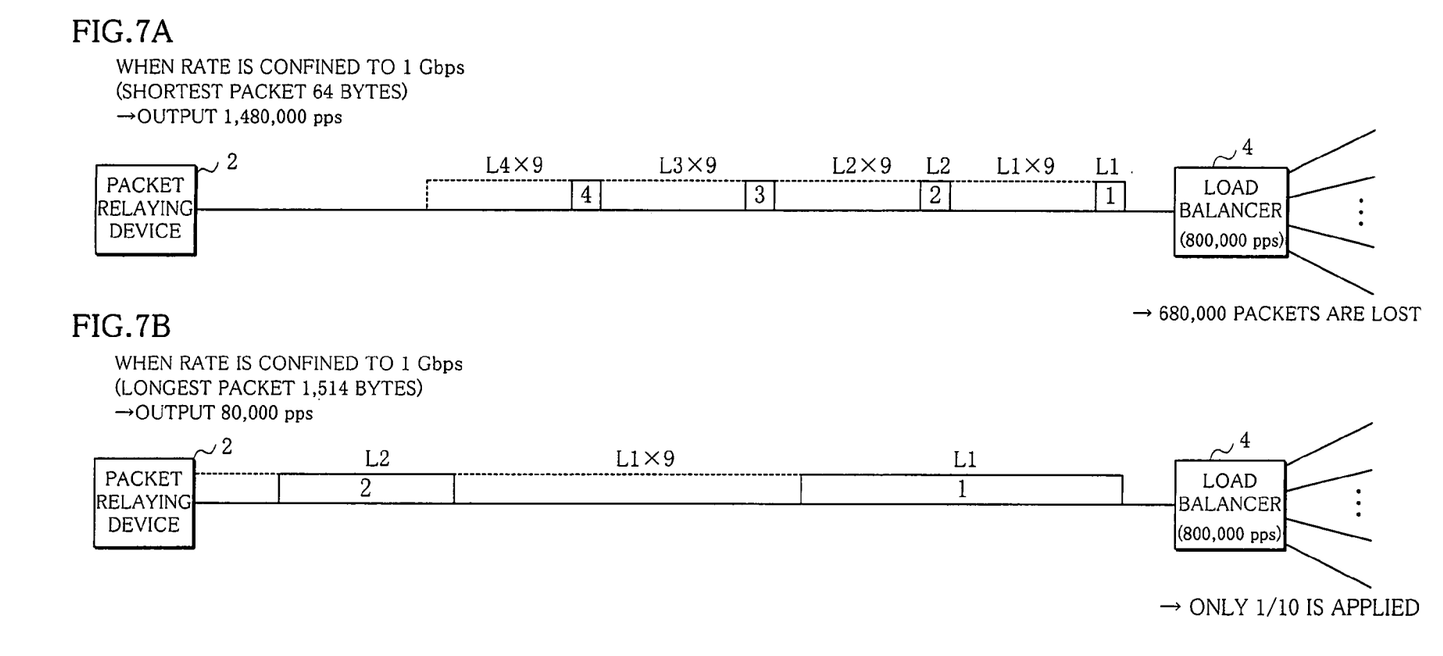
FIGS. 7A and 7B are diagrams showing a packet relaying system [1] in the network arrangement shown in FIG. 5.

Firstly, when a line rate (speed) on the output side of the packet relaying device 2 is confined to 1 Gbps as shown in FIG. 7A and the packet transmitted is supposed to be the shortest packet of 64 bytes, the output data assume 1,480,000 pps. Supposing that the throughput of the load balancer 4 is 800,000 pps, 680,000 packets will be lost. Namely, supposing that eight terminals 5 are connected to the load balancer 4 and a request throughput of the terminal 5 is 100,000 pps per terminal, the packets are discarded on the side of the terminal 5 when the packets of equal to or more than 800,000 pps are flowed to the load balancer 4.

On the other hand, when the packet transmitted at the same rate is the longest packet of 1,514 bytes, as shown in FIG. 7B, the output data become 80,000 pps. Although the throughput of the load balancer 4 is not exceeded in this case, there is a problem that only 1/10 is worked.

Figure 8A:
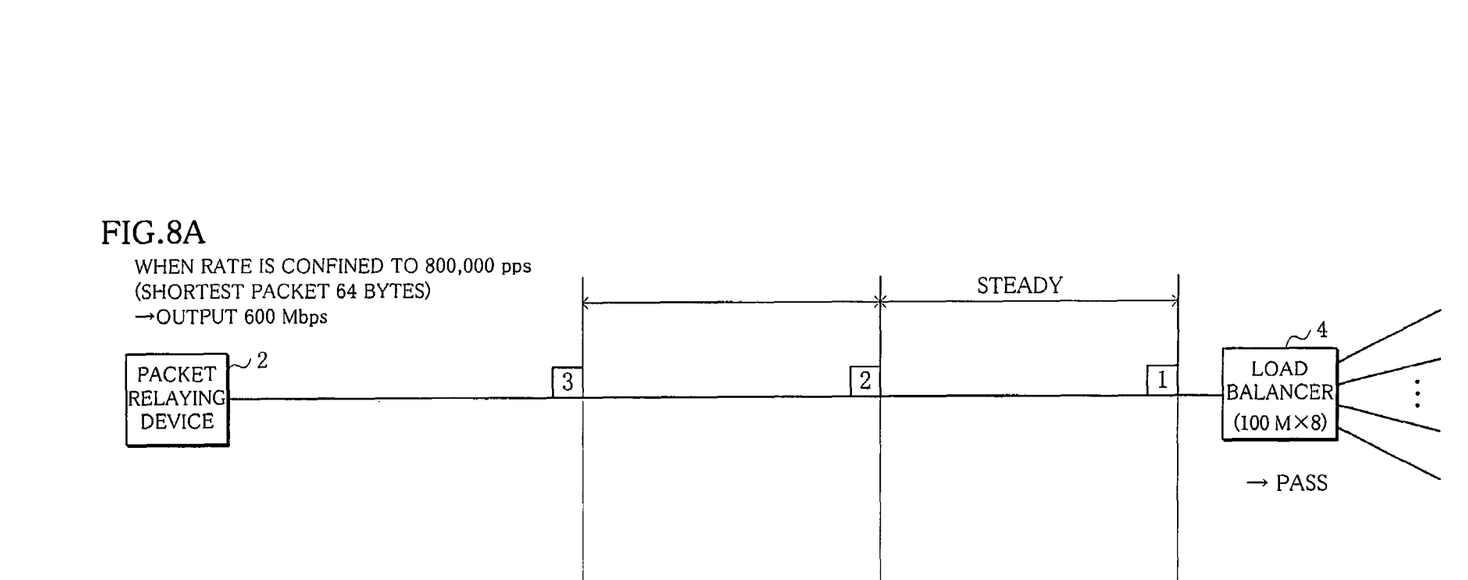
FIGS. 8A and 8B are diagrams showing a packet relaying system [2] in the network arrangement shown in FIG. 5.
Figure 8B:
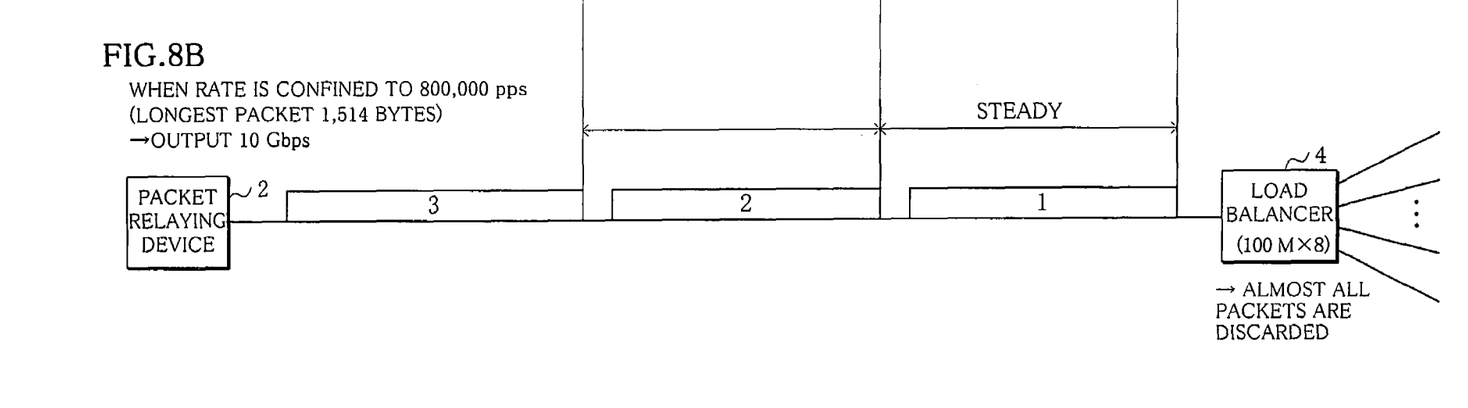

Furthermore, when the line rate is confined to 800,000 pps as shown in FIG. 8A and the packet transmitted is the shortest packet of 64 bytes, the output data assume 600 Mbps. If the throughput of a load balancer 4 is supposed to be 100 M×8=800 Mbps, the output data of 600 Mbps will be passed. However, when the packet transmitted at the same rate is the longest packet of 1,514 bytes, as shown FIG. 8B, the output data assume 10 Gbps, which is far beyond the throughput of the load balancer 4, so that almost all the packets are to be discarded.

In the conventional bandwidth setting, it is best to set the line bandwidth of 1 Gbps for a line efficiency since there is only bps setting. However, in that case, almost 1,500,000 pps of packets are flowed to the load balancer depending on the frame length. On the other hand, when the line rate is confined to within 800,000 pps, the bandwidth has to be confined to about 600 Mbps in the bps setting.

Thus, only by the bandwidth control of the bit number (bps) or the packet number (pps), the desired QoS can not be obtained.

SUMMARY OF THE INVENTION

It is accordingly an object of the present invention to provide a method and device for performing a packet relay which can harmonize a data bit number (bps) with a packet number (pps) in a network of a variable length packet system.

In order to achieve the above-mentioned object, a packet relaying method according to the present invention comprises: a first step of coloring an inputted packet based on a predetermined peak (limit) bandwidth of a data bit number (number of data bit) per unit time for every flow and a packet length of the inputted packet; a second step of coloring an inputted packet based on a predetermined peak bandwidth of a packet number (number of packet) per unit time for every flow and a packet number of the inputted packet; and a third step of determining a color of the inputted packet with a higher priority being given to a color of packet to be discarded, within the colors obtained by colorings at the first and the second steps.

Namely, at the first step an inputted packet is colored based on a predetermined peak bandwidth of a data bit number (quantity of data bit flow) preset per unit time for every flow and a packet length of the inputted packet. At the second step an inputted packet is colored based on a predetermined peak bandwidth of a packet number (quantity of packet flow) preset per unit time for every flow and a packet number of the inputted packet. At the third step a color of the inputted packet is determined with a higher priority being given to a color of packet to be discarded (red) within the colors thus obtained by colorings at the first and the second steps.

Thus, it becomes possible to designate both of the predetermined peak bandwidths of the quantity of the data bit flow and the quantity of the packet flow, thereby enabling a packet flow bandwidth to be controlled without devouring the bandwidth.

Also, in a packet relaying method according to the present invention comprises: a first step of coloring an inputted packet based on a predetermined committed (guaranteed) bandwidth of a data bit number per unit time for every flow and a packet length of the inputted packet; a second step of coloring an inputted packet based on a predetermined committed bandwidth of a packet number per unit time for every flow and a packet number of the inputted packet; and a third step of determining a color of the inputted packet with a higher priority being given to a color of packet to be discarded with a probability (partly discarded or passed)(yellow), within the colors obtained by colorings at the first and the second steps.

Namely, in this method, a predetermined committed bandwidth is substituted for the above-mentioned predetermined peak bandwidth, so that it is made possible to simultaneously set predetermined committed bandwidths of the quantity of the data bit and the quantity of the packet flow, thereby committing the rate and controlling the packet flow bandwidth to pass important packets to such an extent as not to devour the bandwidth.

Furthermore, in a packet relaying method according to the present invention comprises: a first step of coloring an inputted packet based on a first predetermined peak bandwidth of a data bit number per unit time for every flow, a first predetermined committed bandwidth and a packet length of the inputted packet; a second step of coloring an inputted packet based on a second predetermined peak bandwidth of a packet number per unit time for every flow, a second predetermined committed bandwidth and a packet number of the inputted packet; and a third step of determining one of a color of packet to be discarded (red), a color of packet to be passed (blue) and a color of packet to be discarded with a probability (yellow), within the colors obtained by colorings of the first and second steps.

Namely, in this method, by using both of the above-mentioned predetermined peak bandwidths and committed bandwidths, one of a color of packet to be discarded, a color of packet to be passed or a color of packet to be discarded with a probability (partly passed) is determined to be assigned to the inputted packet. Thus, it becomes possible not to devour the bandwidth and to more efficiently provide important packets.

The above-mentioned data bit number (peak token counter) may be a value increased by the peak bandwidth from the data bit number at a packet input time and the packet number (peak token counter) may be a value increased by the predetermined peak bandwidth from the packet number at a packet input time; when the data bit number is smaller than the packet length of the inputted packet at the first step, the inputted packet may be colored in red as the color of packet to be discarded, while otherwise the inputted packet may be colored in blue, and when the packet number is smaller than the packet number of inputted packet at the second step, the inputted packet may be colored in red, while otherwise the inputted packet may be colored in blue.

Alternatively, the above-mentioned data bit number (committed token counter) may be a value increased by the predetermined committed bandwidth from the data bit number at a packet input time and the packet number (committed token counter) may be a value increased by the predetermined committed bandwidth from the packet number at a packet input time; when the data bit number is larger than the packet length of the inputted packet at the first step, the inputted packet may be colored in blue as the color of packet to be passed, while otherwise the inputted packet may be colored in red, and when the packet number is larger than the packet number of the inputted packet at the second step, the inputted packet may be colored in blue, while otherwise the inputted packet may be colored in red.

Furthermore, the above-mentioned data bit number may include first and second bit numbers respectively increased by the first predetermined peak bandwidth and the first predetermined committed bandwidth from the data bit number at a packet input time and the packet number may include first and second packet numbers respectively increased by the second predetermined peak bandwidth and the second predetermined committed bandwidth from the packet number at a packet input time; when the first bit number is smaller than the packet length of the inputted packet at the first step, the inputted packet may be colored in red as the color of packet to be discarded; when the first bit number is larger than the packet length and the second bit number is larger than the packet length, the inputted packet may be colored in blue as the color of packet to be passed; while otherwise the inputted packet may be colored in yellow; when the first packet number is smaller than the packet number of the inputted packet at the second step, the inputted packet may be colored in red as the color of packet to be discarded; when the first packet number is larger than the packet number and the second packet number is larger than the packet number, the inputted packet may be colored in blue as the color of packet to be passed; while otherwise the inputted packet may be colored in yellow; and the color of the inputted packet may be determined with a higher priority being given to red, yellow, and blue in this order upon occurrence of conflict at the third step.

A packet relaying device for realizing the above-mentioned packet relaying method according to the present invention comprises: first means coloring an inputted packet based on a predetermined peak bandwidth of a data bit number per unit time for every flow and a packet length of the inputted packet; second means coloring an inputted packet based on a predetermined peak bandwidth of a packet number per unit time for every flow and a packet number of the inputted packet; and third means determining a color of the inputted packet with a higher priority being given to a color of packet to be discarded, within the colors obtained by colorings at the first and the second means.

Alternatively, a packet relaying device according to the present invention comprises: first means coloring an inputted packet based on a predetermined committed bandwidth of a data bit number per unit time for every flow and a packet length of the inputted packet; second means coloring an inputted packet based on a predetermined committed bandwidth of a packet number per unit time for every flow and a packet number of the inputted packet; and third means determining a color of the inputted packet with a higher priority being given to a color of packet to be discarded with a probability, within the colors obtained by colorings at the first and the second means.

Furthermore, a packet relaying device according to the present invention comprises: first means coloring an inputted packet based on a first predetermined peak bandwidth of a data bit number per unit time for every flow, a first predetermined committed bandwidth and a packet length of the inputted packet; second means coloring an inputted packet based on a second predetermined peak bandwidth of a packet number per unit time for every flow, a second predetermined committed bandwidth and a packet number of the inputted packet; and third means determining one of a color of packet to be discarded, a color of packet to be passed and a color of packet to be partly discarded, within the colors obtained by colorings of the first and second means.

The above-mentioned data bit number may be a value increased by the predetermined peak bandwidth from the data bit number at a packet input time and the packet number may be a value increased by the predetermined peak bandwidth from the packet number at a packet input time; when the data bit number is smaller than the packet length of the inputted packet at the first means, the inputted packet may be colored in red as the color of packet to be discarded, while otherwise the inputted packet may be colored in blue, and when the packet number is smaller than the packet number of the inputted packet at the second means, the inputted packet may be colored in red, while otherwise the inputted packet may be colored in blue.

Alternatively, the above-mentioned data bit number may be a value increased by the predetermined committed bandwidth from the data bit number at a packet input time and the packet number may be a value increased by the predetermined committed bandwidth from the packet number at a packet input time; when the data bit number is larger than the packet length of the inputted packet at the first means, the inputted packet may be colored in blue as the color of packet to be passed, while otherwise the inputted packet may be colored in red, and when the packet number is larger than the packet number of the inputted packet at the second means, the inputted packet may be colored in blue, while otherwise the inputted packet may be colored in red.

Alternatively, the above-mentioned data bit number may include first and second bit numbers respectively increased by the first predetermined peak bandwidth and the first predetermined committed bandwidth from the data bit number at a packet input time and the packet number may include first and second packet numbers respectively increased by the second predetermined peak bandwidth and the second predetermined committed bandwidth from the packet number at a packet input time; when the first bit number is smaller than the packet length of the inputted packet at the first means, the inputted packet may be colored in red as the color of packet to be discarded; when the first bit number is larger than the packet length and the second bit number is larger than the packet length, the inputted packet may be colored in blue as the color of packet to be passed; while otherwise the inputted packet may be colored in yellow; when the first packet number is smaller than the packet number of the inputted packet at the second means, the inputted packet may be colored in red as the color of packet to be discarded; when the first packet number is larger than the packet number and the second packet number is larger than the packet number, the inputted packet may be colored in blue as the color of packet to be passed; while otherwise the inputted packet may be colored in yellow; and the color of the inputted packet may be determined with a higher priority being given to red, yellow, and blue in this order upon occurrence of conflict at the third means.

Also, in the present invention, a packet relaying device is provided which comprises: first means coloring an inputted packet based on a predetermined peak bandwidth of a data bit number per unit time for every flow, a predetermined committed bandwidth and a packet length of the inputted packet; second means coloring an inputted packet based on a predetermined peak bandwidth of a packet number per unit time for every flow, a predetermined committed bandwidth and a packet number of the inputted packet; and third means determining a color of the inputted packet with a higher priority being given to a color of packet to be discarded, a color of packet to be discarded with a probability, and a color of packet to be passed in this order, within the colors obtained by colorings at the first and the second means.

According to the present invention, since shaping can be performed by both of the data bit number (bps) and the packet number (pps), both of the congestions of the lines and the devices can be controlled and a network with more stable QoS can be structured.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Hereinafter, an embodiment of the packet relaying method and device according to the present invention will be described referring to the attached figures.

Figure 1:
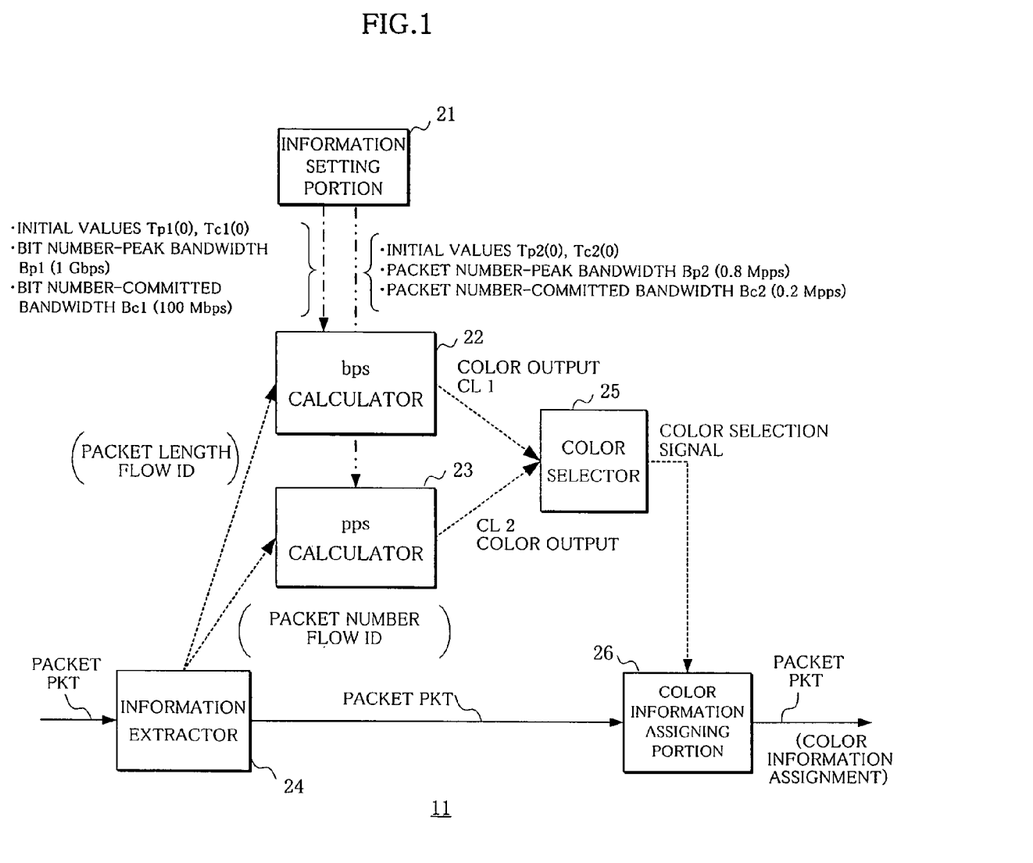
FIG. 1 is a block diagram showing an embodiment of a metering processor used in a packet relaying method and device according to the present invention.

FIG. 1 shows an embodiment according to the present invention of the metering processor 11 of the packet relaying device shown in FIG. 6. The metering processor 11 performs metering in terms of both data bit number (bps) and packet number (pps).

In this embodiment, an information setting portion 21 is connected to transmit setting contents designated by a user to a bps calculator 22 and a pps calculator 23. The setting values from the information setting portion 21 to the bps calculator 22 are initial values $Tp1(0)$ and $Tc1(0)$, a bit number-peak bandwidth Bp1 and a bit number-committed bandwidth Bc1. An example of the bit number-peak bandwidth Bp1 in this embodiment is 1 Gbps as shown in bandwidth settings (a) and (b) of FIG. 5, and an example of the bit number-committed bandwidth Bc1 is 100 Mbps.

Also, the setting values from the information setting portion 21 to the pps calculator 23 are initial values $Tp2(0)$ and $Tc2(0)$, a packet number-peak bandwidth Bp2 and a packet number-committed bandwidth Bc2. An example of the packet number-peak bandwidth Bp2 in this embodiment is 0.8 Mpps (800,000 pps) as shown in the bandwidth settings (a) and (b) of FIG. 5 similarly, and an example of the packet number-committed bandwidth Bc2 is 0.2 Mpps (200,000 pps).

The initial value $Tp1(0)$ is referred to as a Peak Burst Size (PBS), that is a value for limiting the maximum value of the quantity of the data bit flow which can be outputted at a burst time.

Also, the initial value $Tc1(0)$ is referred to as a Committed Burst Size (CBS), that is a setting value for committing the minimum value of the quantity of the data bit flow which can be outputted at a burst time. In the flow to which the committed burst size is set, a communication more than the committed burst size can be performed upon burst occurrence.

Also, the initial value $Tc2(0)$ is referred to as a Peak Burst Packet (PBP), that is a setting value for limiting the maximum value of the quantity of the packet flow which can be outputted at a burst time in the same way as the peak burst size.

Furthermore, the initial value $Tc2(0)$ is referred to as a Committed Burst Packet (CBP), that is a setting value for committing the minimum value of the quantity of the packet flow which can be outputted at a burst time.

Also, "peak bandwidth" indicates the maximum bandwidth (maximum quantity of flow) which can be used by a certain flow. It is possible to set the bandwidth in terms of both bit number (bps) and packet number (pps).

Also, "committed bandwidth" indicates the minimum bandwidth (quantity of flow) to be committed or guaranteed for a certain flow. This case makes it possible to set the bandwidth in terms of both bit number (bps) and packet number (pps).

An information extractor 24 extracts from a packet PKT inputted a packet length to be provided to the bps calculator 22, and extracts the packet number to be provided to the pps calculator 23. In this case, the information extractor 24 provides the packet length and the packet number for every flow, i.e. for every identical flow identifier to the bps calculator 22 and the pps calculator 23 respectively.

The bps calculator 22 performs a color determination for the inputs, and outputs a color output CL1 to a color selector 25. The pps calculator 23 also performs a color determination for the inputs, and provides a color output CL2 to the color selector 25. The color selector 25 determines a flow state for the inputted packet PKT based on the color outputs CL1 and CL2 to be provided as a color selection signal to a color information assigning portion 26. The color information assigning portion 26 has both of packets and color information, and assigns the color information to the packet PKT to be transferred to a WRED processor 12 at the subsequent stage.

The flow of packet processing hereafter is the same as the conventional technology shown in FIG. 6.

bps Calculator 22

Figure 2:
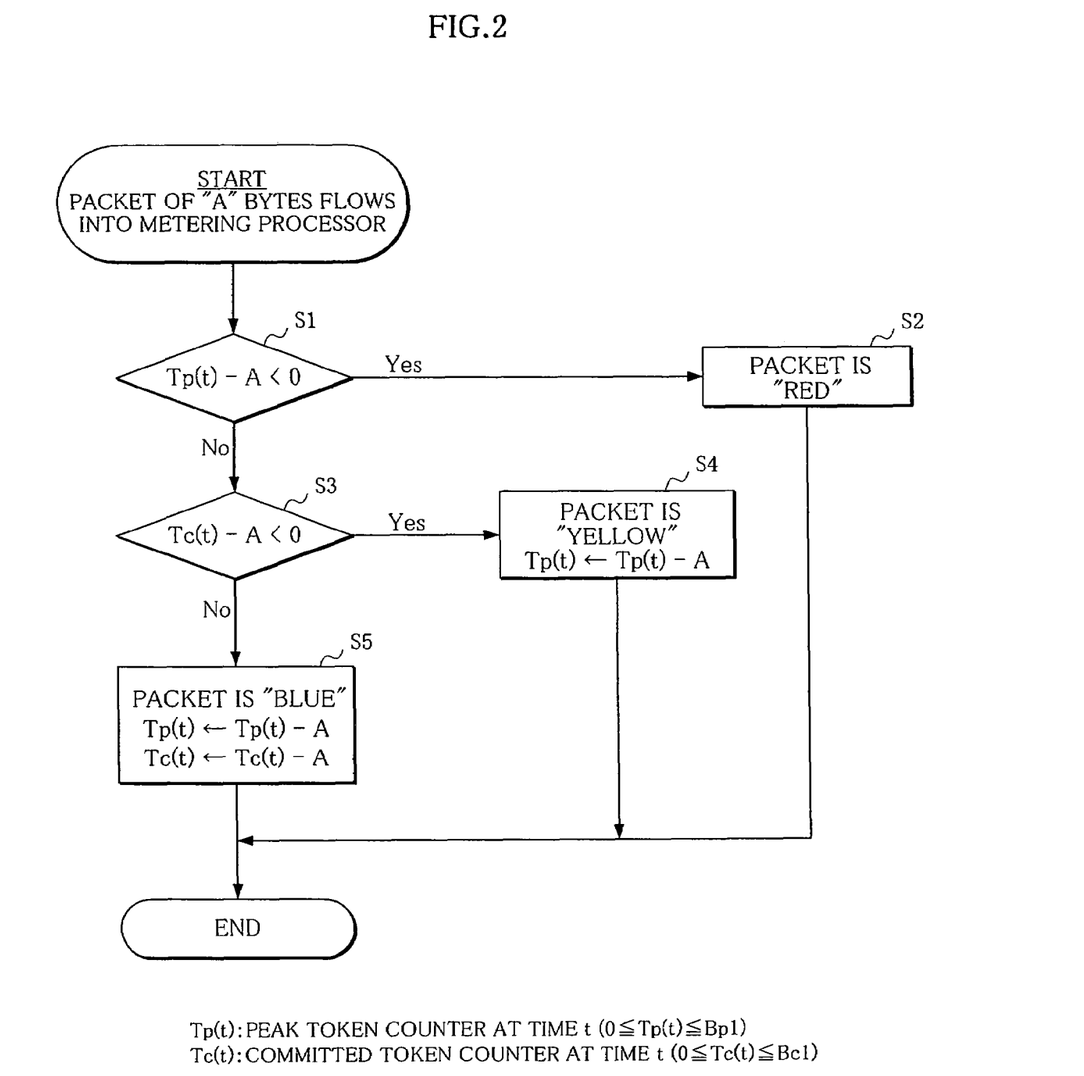
FIG. 2 is a flowchart showing a processing procedure example of a bps calculator used in the metering processor shown in FIG. 1.

FIG. 2 shows an example of a processing procedure in the bps calculator 22 shown in FIG. 1. Firstly, when it is notified to the bps calculator 22 from the information extractor 24 that the packet of "A" bytes is inputted, Tp(t) is compared with the packet length A at step S1.

The Tp(t) is referred to as a peak token counter at a time "t", takes a value equal to or less than the peak burst size Tp(0) as mentioned above, and indicates the packet number which can be outputted from the queue portion 13 shown in FIG. 6.

Accordingly, when the peak token counter Tp(t) is less than the packet length A (Tp(t)−A<0) at step S1, the packet is colored in "red", since it is to be discarded (at step S2), while otherwise the process proceeds to step S3.

At step S3, Tc(t) is compared with the packet length A. Tc(t) in this case indicates a committed token counter at a time "t" and takes a value equal to or less than the committed burst size Tc(0). When the committed token counter Tc(t) is less than the packet length A (Tc(t)−A<0), the packet is colored in "yellow" since it is to be discarded with a probability. At the same time, the peak token counter Tp(t) is decremented by the packet length A (Tp(t)−A). Otherwise the process proceeds to step S5 (at step S4).

Since it is recognized that the committed token counter Tc(t) is larger than the packet length A at step S5, the packet is to be passed and is colored in "blue". The peak token counter Tp(t) is decremented by the packet length A (Tp(t)−A) and the committed token counter Tc(t) is decremented by the packet length A(Tc(t)−A) to end the routine.

Hereafter, the peak token counter Tp(t) and the committed token counter Tc(t) respectively change according to the following equations per time τ seconds until the subsequent packet arrives:

$$Tp(t+\tau) = Tp(t) + Bp \times \tau \quad \text{Eq. (1)}$$

$$Tc(t+\tau) = Tc(t) + Bc \times \tau \quad \text{Eq. (2)}$$

Namely, the equation (1) indicates that the peak token counter Tp(t) increments by the peak bandwidth Bp in time τ seconds (however, the peak token counter Tp(t) does not exceed the peak burst size Tp(0)), and the equation (2) indicates that the committed token counter Tc(t) increments by the committed bandwidth Bc in time τ seconds (however, the committed token counter Tc(t) does not exceed the committed burst size Tc(0)).

Figure 4A:
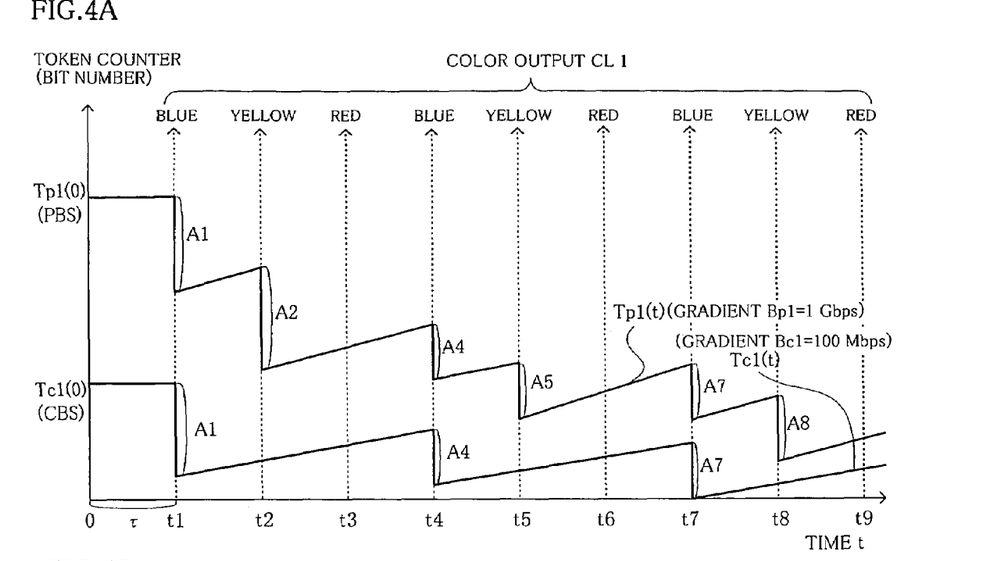
FIGS. 4A-4C are diagrams showing a color determination sequence and a color selector output by calculators shown in FIGS. 2 and 3.

FIG. 4A shows a sequence of processing procedure in the bps calculator 22 shown in FIG. 2. This example indicates that the packets are inputted at times t1-t9 and together with the input the color determination is performed. It is to be noted that "1" is added to the token counter and the burst size respectively in the bps calculator 22, while "2" is added to the token counter and the burst size in the pps calculator 23 described later, thereby distinguishing the token counter and the burst size in the bps calculator 22 from those in the pps calculator 23.

As shown in FIG. 4A, the ordinate indicates the peak/committed token counter (data bit number). At the time t=0, the peak burst size Tp1(0) (PBS) and the committed burst size Tc1(0) (CBS) which are the initial values are set.

When the packet whose length is A1 is inputted to the metering processor 11 at the time t1, the process in the bps calculator 22 having received the packet proceeds to step S3 from step S1 in the flowchart of FIG. 2 since Tp1(0)−A1>0 as shown in FIG. 4A. Since Tc1(0)−A1>0 at step S3, the process proceeds to step S5 from step S3. The coloring of the packet is set to "blue", Tp1(t1) is updated to "Tp1(0)−A1", and Tc1(t1) is updated to "Tc1(t1)−A1".

As a result, at the time t1 of FIG. 4A, the token counters Tp1(t1) and Tc1(t1) respectively assumes values decreased from the burst sizes Tp1(0) and Tc1(0) by the packet length A1.

As shown in the above-mentioned equations (1) and (2), the token counters Tp1(t) is increased by the peak bandwidth Bp1 (gradient) every time τ seconds. It is to be noted that the peak bandwidth in this case is "1 Gbps" as mentioned above.

Also, since the committed token counter Tc1(t) is similarly increased by the committed bandwidth Bc1 (gradient) every time τ seconds, the token counters Tp1(t) and Tc1(t) are increased respectively by the gradients Bp1 and Bc1 from the time t1 to the time t2.

The peak token counter Tp1(2) at the time t2 is a value increased by the peak bandwidth Bp1 from the value at the time t1. When the packet length of the inputted packet is A2 at the time t2, it is found that Tp1(t2)−A2>0 at step S1 in FIG. 2. Therefore, the process proceeds to step S3 from step S1. Since Tc1(t2)−A2<0 at step S3 as shown in FIG. 4A, the process proceeds to step S4, the coloring of the packet is set to "yellow", and the peak token counter Tp1(t) is decremented by the packet length A2. Namely, the coloring at the time t2 becomes "yellow", and the color output CL1 is provided to the color selector 25.

At the time t3 the peak token counter Tp1(t3) is similarly increased by the peak bandwidth Bp1 from the value at the time t2 for a time τ seconds. The committed token counter Tc1(t3) is also increased by the committed bandwidth Bc1. Supposing that the packet whose packet length is A3 is inputted at this time, it is found that Tp1(t3)−A3<0 in the example of FIG. 4A. In this case the coloring of the packet is set to "red" without confirming the relationship between the committed token counter Tc1(t3) and the packet length A3 (at step S2). Accordingly, updating the token counter as shown at steps S4 and S5 is not performed, and the peak token counter Tp1(t) continues to increase by the peak bandwidth Bp1 from the time t2 to the time t4 through the time t3. Similarly, the token counter Tc1(t) continues to increase from the time t1 to the time t4 through the times t2 and t3.

Supposing that the packet length A4 is a length as shown in FIG. 4A when the packet whose length is A4 is inputted at the time t4, it is found that Tp1(t4)−A4>0. Accordingly, the process proceeds to step S3 from step S1. Since it is found that Tc1(t4)−A4>0 at step S3 as shown in FIG. 4A, the process further proceeds to step S5, the color output CL1 in which the coloring of the packet is set to "blue" is transmitted to the color selector 25, the peak token counter Tp1(t4) is decremented by the packet length A4, and the committed token counter Tc1(t4) is similarly decremented by the packet length A4.

Hereafter, the color determination is similarly performed at times t5-t9, and color output CL1 corresponding the determination is provided to the color selector 25.

pps Calculator 23

Figure 3:
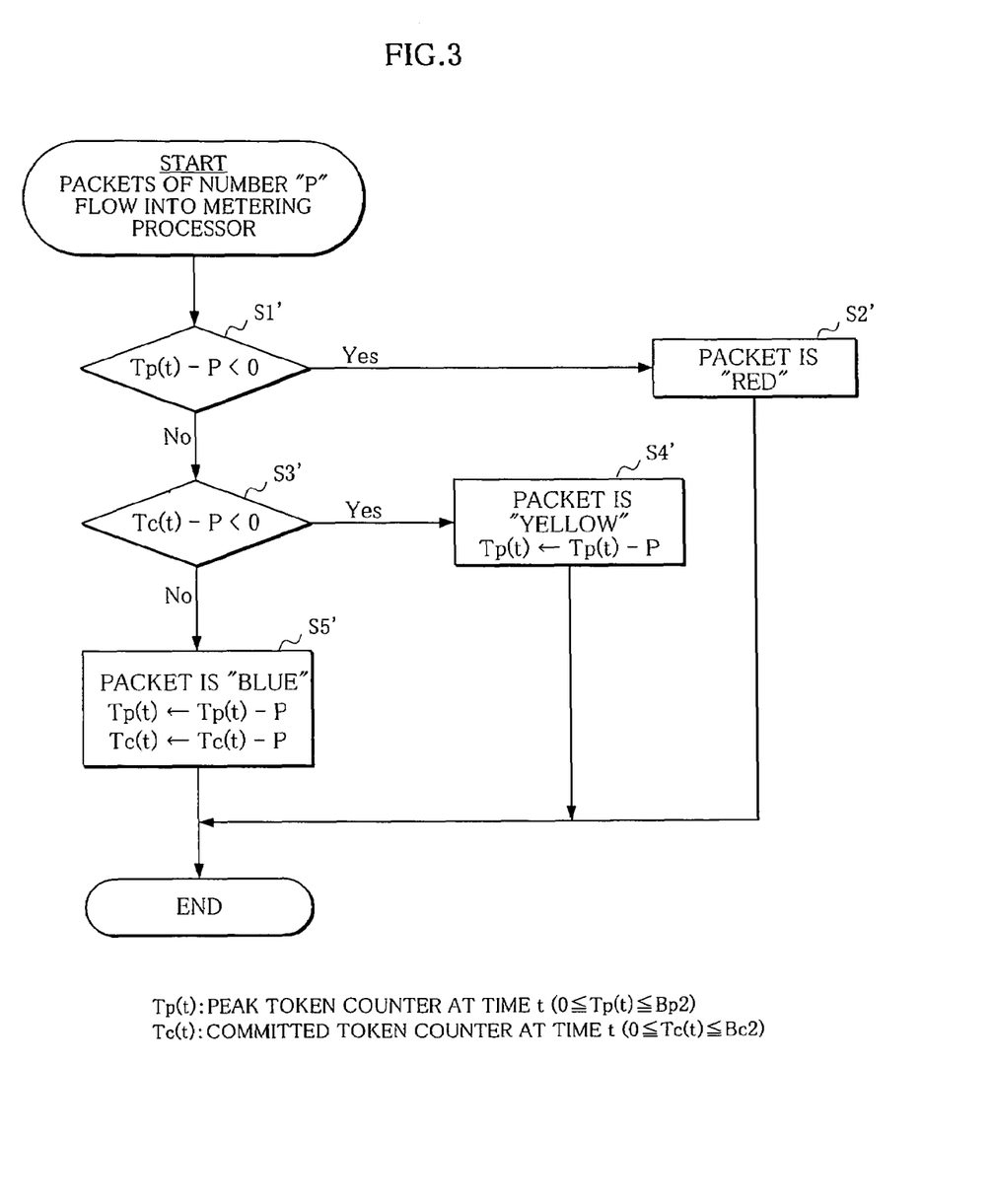
FIG. 3 is a flowchart showing a processing procedure example of a pps calculator used in the metering processor shown in FIG. 1.

FIG. 3 shows a processing procedure example of the pps calculator 23 shown in FIG. 1. The difference between the processing procedure of FIG. 3 and that of the bps calculator 22 shown in FIG. 2 is that a packet number P is substituted for the packet length A of the inputted packet. Accordingly, steps S1'-S5' shown in FIG. 3 are indicated by adding an apostrophe (') to corresponding steps S1-S5 in FIG. 2. The processing procedure of FIG. 3 will now be described referring to the color determination sequence at the pps calculator 23 shown in FIG. 4B.

Figure 4B:
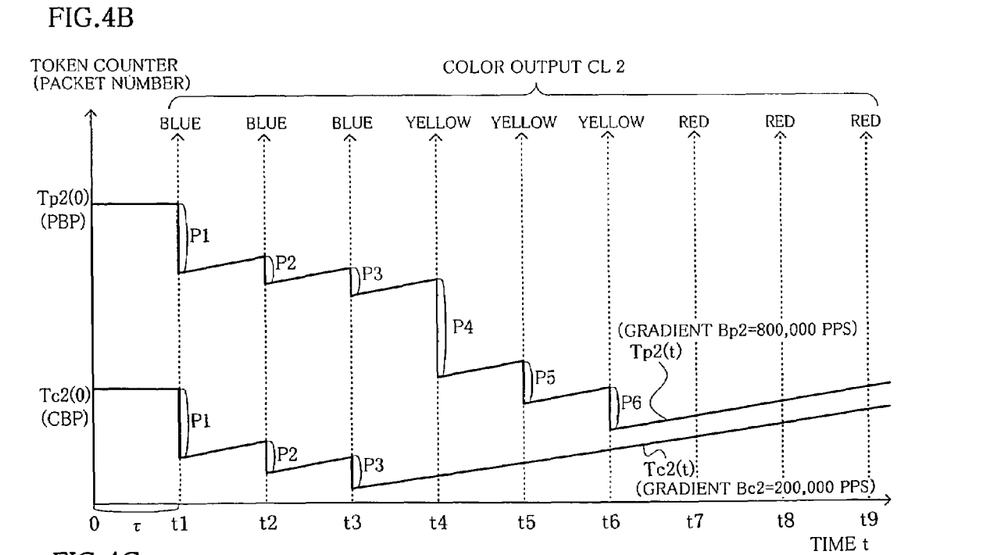

As shown in FIG. 4B, the ordinate indicates the peak/committed token counter (packet number). At the time t=0, the peak burst packet Tp2(0) (PBP) and the committed burst packet Tc2(0) (CBP) that are the initial values are set.

When the packets PKT of number P1 are inputted to the metering processor 11 at the time t1, the process proceeds to S3' from step S1' in the flowchart of FIG. 3 since Tp2(0)−P1>0, as shown in FIG. 4B, at the pps calculator 23 having received the packets. Since Tc2(0)−P1>0, as shown in FIG. 4B, at step S3', the process proceeds to step S5' from step S3', the coloring of the packet is set to "blue", Tp2(t1) is updated to "Tp2(0)−P1", and the Tc2(t1) is updated to "Tc2(0)−P1".

As a result, at the time t1 of FIG. 4B, the token counters Tp2(t) and Tc2(t) respectively become values in which the burst packets Tp2(0) and Tc2(0) are decreased by the packet number P1.

As shown in the above-mentioned equations (1) and (2), the token counter Tp2(t) is increased by the peak bandwidth Bp2 (gradient) every τ seconds. It is to be noted that the peak bandwidth in this case is "800,000 pps" as mentioned above.

Also, since the committed token counter Tc2(t) is similarly increased by the committed bandwidth Bc2 (gradient) every τ seconds, the token counters Tp2(t) and Tc2(t) are increased by the gradients Bp2 and Bc2 respectively from the time t1 to the time t2.

At the time t2, the peak token counter Tp2(t2) is increased by the peak bandwidth Bp2 from the value at the time t1. When the packet number of the inputted packet is P2 at the time t2, the process proceeds to step S3'from step S1' since Tp2(t2)−P2>0 at step S1' of FIG. 3. Since Tc2(t2)−P2>0 at step S3' as shown in FIG. 4B, the process proceeds to step S5', the coloring of packet is set to "blue" in the same way as the case at the time t1, so that the token counters Tp2(t2) and Tc2(t2) are decremented by the packet number P2. Namely, at the time t2, the color output CL2 in which the coloring is "blue" is provided to the color selector 25.

At the time t3, based on the packet number P3, the color output CL2 in which the coloring is "blue" in the same way as the case at times t1 and t2 is provided to the color selector 25.

At the time t4, the token counter Tp2(t) is similarly increased by the peak bandwidth Bp2 for a time r seconds from the time t3, and the token counter Tc2(t) is increased by the committed bandwidth Bc2. Supposing that the packets of number P4 are inputted at this time, the process proceeds to step S3' since Tp2(t4)−P4>0. Since Tc2(t4)−P4<0 at step S3', the process proceeds to step S4', the coloring of the packet is set to "yellow", and the token counter Tp2(t4) is decremented by the packet number P4. Namely, the color output CL2 in which the coloring is "yellow" is provided to the color selector 25 at the time t4.

At the times t5 and t6, based on the packet number P5 and P6, the color output CL2 in which the coloring is "yellow" is similarly provided to the color selector 25.

When the packets of number P7 are inputted at the time t7, the token counter Tp2(t7)−P7<0 in the example of FIG. 4B. Therefore, the process proceeds to step S2' from step S1', and the color output CL2 in which the coloring of the packet is set to "red" is provided to the color selector 25 without confirming the relationship between the token counter Tc2(t7) and the packet number P7.

Hereafter, the same procedure is performed at times t8 and t9, and the color output CL2 is provided to the color selector 25.

Figure 4C:
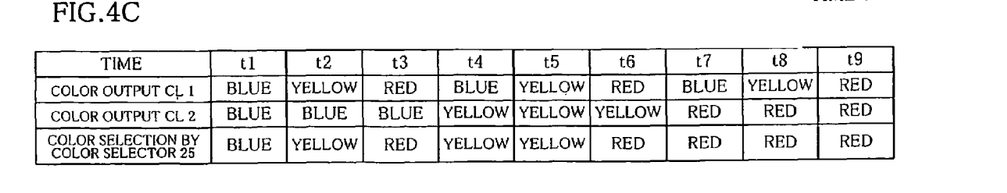

FIG. 4C shows the output of the color selector 25 which thus inputs the color output CL1 from the bps calculator 22 and the color output CL2 from the pps calculator 23.

Namely, a selection algorithm of the color selector 25 indicates that a higher priority is given to the color of packet to be discarded, and the color of the frame is finally determined from the color outputs CL1 and CL2. If either of the color outputs CL1 and CL2 is "red", "red" is selected. If there is no "red" and either one is "yellow", "yellow" is preferentially selected. In other cases (in case of both are "blue"), "blue" is selected to be provided to the color information assigning portion 26. Accordingly, the color selection signals outputted from the color selector 25 become as shown in FIG. 4C at the times t1-t9 in FIGS. 4A and 4B.

Thus, since the setting of "less than 1 Gbps and 800,000 pps" is enabled in the case of the packet relaying method of the present invention, when the frame length requested is long, the performance up to the line bandwidth 1 Gbps can be exerted, while when the frame length requested is short, the performance up to 800,000 pps in total of the terminals can be exerted.

What is claimed is:

1. A packet relaying method comprising:
a first step of coloring an inputted packet based on a predetermined peak bandwidth of a data bit number per unit time for every flow and a packet length of the inputted packet;
a second step of coloring an inputted packet based on a predetermined peak bandwidth of a packet number per unit time for every flow and a packet number of the inputted packet; and
a third step of determining a color of the inputted packet with a higher priority being given to a color of packet to be discarded, within the colors obtained by colorings at the first and the second steps, wherein the data bit number is a value increased by the peak bandwidth from the data bit number at a packet input time and the packet number is a value increased by the peak bandwidth from the packet number at a packet input time; when the data bit number is smaller than the packet length of the inputted packet at the first step, the inputted packet is colored in red as the color of packet to be discarded, while otherwise the inputted packet is colored in blue, and when the packet number is smaller than the packet number of the inputted packet at the second step, the inputted packet is colored in red, while otherwise the inputted packet is colored in blue.

2. A packet relaying method comprising:
a first step of coloring an inputted packet based on a predetermined committed bandwidth of a data bit number per unit time for every flow and a packet length of the inputted packet;
a second step of coloring an inputted packet based on a predetermined committed bandwidth of a packet number per unit time for every flow and a packet number of the inputted packet; and
a third step of determining a color of the inputted packet with a higher priority being given to a color of packet to be discarded with a probability, within the colors obtained by colorings at the first and the second steps, wherein the data bit number is a value increased by the committed bandwidth from the data bit number at a packet input time and the packet number is a value increased by the committed bandwidth from the packet number at a packet input time; when the data bit number is larger than the packet length of the inputted packet at the first step, the inputted packet is colored in blue as the color of packet to be passed, while otherwise the inputted packet is colored in red, and when the packet number is larger than the packet number of the inputted packet at the second step, the inputted packet is colored in blue, while otherwise the inputted packet is colored in red.

3. A packet relaying method comprising:
a first step of coloring an inputted packet based on a first predetermined peak bandwidth of a data bit number per unit time for every flow, a first predetermined committed bandwidth and a packet length of the inputted packet;
a second step of coloring an inputted packet based on a second predetermined peak bandwidth of a packet number per unit time for every flow, a second predetermined committed bandwidth and a packet number of the inputted packet; and
a third step of determining one of a color of packet to be discarded, a color, of packet to be passed and a color of packet to be discarded with a probability, within the colors obtained by colorings of the first and second steps, wherein the data bit number includes first and second bit numbers respectively increased by the first predetermined peak bandwidth and the first predetermined committed bandwidth from the data bit number at a packet input time and the packet number includes first and second packet numbers respectively increased by the second predetermined peak bandwidth and the second predetermined committed bandwidth from the packet number at a packet input time; when the first bit number is smaller than the packet length of the inputted packet at the first step, the inputted packet is colored in red as the color of packet to be discarded; when the first bit number is larger than the packet length and the second bit number is larger than the packet length, the inputted packet is colored in blue as the color of packet to be passed; while otherwise the inputted packet is colored in yellow; when the first packet number is smaller than the packet number of the inputted packet at the second step, the inputted packet is colored in red as the color of packet to be discarded; when the first packet number is larger than the packet number and the second packet number is larger than the packet number, the inputted packet is colored in blue as the color of packet to be passed; while otherwise the inputted packet is colored in yellow; and the color of the inputted packet is determined with a higher priority being given to red, yellow, and blue in this order upon occurrence of conflict at the third step.

4. A packet relaying device comprising:
first means coloring an inputted packet based on a predetermined peak bandwidth of a data bit number per unit time for every flow and a packet length of the inputted packet;
second means coloring an inputted packet based on a predetermined peak bandwidth of a packet number per unit time for every flow and a packet number of the inputted packet; and
third means determining a color of the inputted packet with a higher priority being given to a color of packet to be discarded, within the colors obtained by colorings at the first and the second means, wherein the data bit number is a value increased by the predetermined peak bandwidth from the data bit number at a packet input time and the packet number is a value increased by the predetermined peak bandwidth from the packet number at a packet input time; when the data bit number is smaller than the packet length of the inputted packet at the first means, the inputted packet is colored in red as the color of packet to be discarded, while otherwise the inputted packet is colored in blue, and when the packet number is smaller than the packet number of the inputted packet at the second means, the inputted packet is colored in red, while otherwise the inputted packet is colored in blue.

5. A packet relaying device comprising:
first means coloring an inputted packet based on a predetermined committed bandwidth of a data bit number per unit time for every flow and a packet length of the inputted packet;
second means coloring an inputted packet based on a predetermined committed bandwidth of a packet number per unit time for every flow and a packet number of the inputted packet; and
third means determining a color of the inputted packet with a higher priority being given to a color of packet to be discarded with a probability, within the colors obtained by colorings at the first and the second means, wherein the data bit number is a value increased by the predetermined committed bandwidth from the data bit number at a packet input time and the packet number is a value increased by the predetermined committed bandwidth from the packet number at a packet input time; when the data bit number is larger than the packet length of the inputted packet at the first means, the inputted packet is colored in blue as the color of packet to be passed, while otherwise the inputted packet is colored in red, and when the packet number is larger than the packet number of the inputted packet at the second means, the inputted packet is colored in blue, while otherwise the inputted packet is colored in red.

6. A packet relaying device comprising:
first means coloring an inputted packet based on a first predetermined peak bandwidth of a data bit number per unit time for every flow, a first predetermined committed bandwidth and a packet length of the inputted packet;
second means coloring an inputted packet based on a second predetermined peak bandwidth of a packet number per unit time for every flow, a second predetermined committed bandwidth and a packet number of the inputted packet; and
third means determining one of a color of packet to be discarded, a color of packet to be passed and a color of packet to be partly discarded, within the colors obtained by colorings of the first and second means, wherein the data bit number includes first and second bit numbers respectively increased by the first predetermined peak bandwidth and the first predetermined committed bandwidth from the data bit number at a packet input time and the packet number includes first and second packet numbers respectively increased by the second predetermined peak bandwidth and the second predetermined committed bandwidth from the packet number at a packet input time; when the first bit number is smaller than the packet length of the inputted packet at the first means, the inputted packet is colored in red as the color of packet to be discarded; when the first bit number is larger than the packet length and the second bit number is larger than the packet length, the inputted packet is colored in blue as the color of packet to be passed; while otherwise the inputted packet is colored in yellow; when the first packet number is smaller than the packet number of the inputted packet at the second means, the inputted packet is colored in red as the color of packet to be discarded; when the first packet number is larger than the packet number and the second packet number is larger than the packet number, the inputted packet is colored in blue as the color of packet to be passed; while otherwise the inputted packet is colored in yellow; and the color of the inputted packet is determined with a higher priority being given to red, yellow, and blue in this order upon occurrence of conflict at the third means.

* * * * *